United States Patent
Franko, Sr.

(10) Patent No.: US 6,624,946 B2
(45) Date of Patent: Sep. 23, 2003

(54) IN-LINE LENTICULAR FILM MANUFACTURING HAVING A SELECTED WEB ORIENTATION

(75) Inventor: Joseph D. Franko, Sr., Ham Lake, MN (US)

(73) Assignee: Quality Assured Enterprises, Inc., Minnetonka, MN (US)

( * ) Notice: Subject to any disclaimer, the term of this patent is extended or adjusted under 35 U.S.C. 154(b) by 74 days.

(21) Appl. No.: 09/840,409

(22) Filed: Apr. 23, 2001

(65) Prior Publication Data

US 2002/0134495 A1 Sep. 26, 2002

Related U.S. Application Data

(63) Continuation-in-part of application No. 09/814,323, filed on Mar. 21, 2001.

(51) Int. Cl.$^7$ .......................... G02B 27/10; G03B 27/32
(52) U.S. Cl. ................................. 359/619; 355/77
(58) Field of Search ................. 359/619, 613, 359/463, 636; 355/77, 22, 132; 430/321, 325, 326, 312, 313, 5

(56) References Cited

U.S. PATENT DOCUMENTS

| | | | |
|---|---|---|---|
| 5,028,950 A | * 7/1991 | Fritsch | 359/619 |
| 5,108,531 A | 4/1992 | Quadracci | 156/277 |
| 5,266,995 A | 11/1993 | Quadracci et al. | 355/77 |
| 5,285,238 A | 2/1994 | Quadracci et al. | 355/77 |
| 5,457,515 A | 10/1995 | Quadracci et al. | 355/132 |
| 5,488,451 A | 1/1996 | Goggins | 355/77 |
| 5,560,799 A | 10/1996 | Jacobsen | 156/277 |
| 5,617,178 A | 4/1997 | Goggins | 355/22 |
| 5,753,344 A | 5/1998 | Jacobsen | 428/142 |
| 5,847,808 A | 12/1998 | Goggins | 355/22 |
| 5,896,230 A | 4/1999 | Goggins | 359/619 |
| 5,967,032 A | 10/1999 | Bravenec et al. | 101/211 |
| 6,026,215 A | * 2/2000 | Fantone et al. | 359/463 |

* cited by examiner

Primary Examiner—Georgia Epps
Assistant Examiner—Omar Hindi
(74) Attorney, Agent, or Firm—Walter K. Roloff; Charles G. Mersereau

(57) ABSTRACT

A process for in-line lenticular film manufacturing having a selected web orientation includes providing an optically clear material web to an in-line converting and/or printing press. The optically clear material web is advanced in the in-line converting and/or printing press in a machine direction of the press. The press includes a lenticule forming means for forming lenticules in the optically clear material web. The lenticules are formed in a selected orientation relative to the machine direction of the press.

6 Claims, 2 Drawing Sheets

IN-LINE LENTICULAR FILM MANUFACTURING HAVING A SELECTED WEB ORIENTATION

RELATED APPLICATION DATA

This application is a continuation-in-part of U.S. application Ser. No. 09/814,323 filed on Mar. 21, 2001. Accordingly, pursuant to 35 U.S.C. 120 and 37 C.F.R. 1.78, this application claims the benefit of the Mar. 21, 2001 filing date.

FIELD OF THE INVENTION

The present invention relates generally to in-line web manufacturing devices and methods. The invention relates further to in-line web manufacturing devices and methods for creation of lenticular lens material having a selected web orientation, utilized in combination with printed images to achieve a three-dimensional illusion.

BACKGROUND OF THE INVENTION

In the printing arts, and in particular in the commercial printed label art for labeling and decorating consumer products, there exists a continual demand for labels and decorations which appeal to consumers; indeed, the commercial success of a given product often relies heavily upon consumer appeal for product packaging and specifically for product decoration and labeling.

Accordingly, manufacturers and retailers have sought marketing strategies for consumer products which exploit the consumer appeal of product labels and decorations (hereinafter, collectively, "labels"). Over the years, labels have evolved from simple printed text descriptions of products, to "eye-catching" multi-color graphics incorporating intricate designs along with product descriptions. Generally, each new label is designed with novelty and brand recognition in mind; label designs tend to be innovative and intriguing to the consumer, in addition to having aesthetic appeal and being identifiable with a particular brand.

It is often desired to impart a special visual effect to a label, such as that of three-dimensionality or of motion. Labels having these three-dimensional ("3D") or motion characteristics are usually considered to be consumer-interactive, for, it is hoped, increased consumer awareness and resulting increased sales of the product so labeled.

In general, 3D and motion visual effects have been costly and difficult to achieve; meanwhile, product manufacturers have demanded that labels be produced for their products as inexpensively as possible, to protect profit margins.

Typically, a pre-formed lenticular lens material is utilized for production of labels having the 3D or motion effect. Lenticular lens material, as known in the art, utilizes rows of simple and commonly dome-shaped lenses or "lenticules", in combination with a lineform or interlaced image, to create a 3D or motion illusion. The lens material is, for the most part, optically clear, and has a flat side and a "lenticulated" side comprising the lenticules. The lineform or interlaced image comprises image segments oriented into contiguous juxtaposed rows. These image segments are typically created on a base material, such as paper, film, or the like. The image segments are specifically designed to correspond to the lenticules of the lens material, and vice-versa. The flat side of the lens material is secured against the segmented image at an orientation where the lenticules are in alignment with the image segments. When the image is then viewed through the lenticulated side of the lens material, a visual 3D or motion illusion results. Discussions of fabrication and use of lenticular lens material, and of lineform or interlaced images, are contained within U.S. Pat. Nos. 5,488,451; 5,617,178; 5,847,808; and 5,896,230, each issued to Goggins.

Examples of production of 3D or motion visual effect labels are found in U.S. Pat. No. 5,967,032 entitled "PRINTING PROCESS USING A THIN SHEET LENTICULAR LENS MATERIAL" issued to Bravenec, et al; and in U.S. Pat. No. 5,266,995 entitled "METHOD FOR FORMING A GRAPHIC IMAGE WEB" issued to Quadracci, et al.

The Quadracci patent discloses the coupling or "marrying" of pre-formed and separately supplied lenticular material with the printed lineform or interlaced image. The Bravenec patent discloses the printing of the image directly onto the flat side of the lenticular material.

It is generally accepted and well-known in the label making arts that in-line printing and converting processes may offer the most cost-effective label production, in terms of speed and efficiency. Exemplary in-line methods are disclosed in U.S. Pat. Nos. 5,560,799 and 5,753,344, each entitled "IN-LINE PRINTING PRODUCTION OF THREE DIMENSIONAL IMAGE PRODUCTS INCORPORATING LENTICULAR TRANSPARENT MATERIAL" and issued to Jacobsen. The Jacobsen patents utilize a pre-lenticularized film in an in-line process.

The aforementioned patented processes are predicated upon a supply of a pre-lenticularized, or lenticular, film. The supply of such lenticular film is usually provided for the in-line processes in roll- or sheet-fed form. Substantial difficulties may be encountered with reliance upon a supply of lenticular film to an in-line process. Chief among these difficulties, relative to label production, is that of lenticular orientation relative to a machine (or, web) direction (a direction in which a relatively long sheet or web of material is travelling through an in-line printing and converting press). As is well-known in the label making art, the machine direction of an in-line process largely determines the orientation of labels, relative to the machine direction, being produced by the process. In an in-line process using a supply of a pre-lenticularized lens material, consideration must be given to the machine direction because, as aforesaid, the lens material must be correctly aligned with the image.

A web of lenticular labels created in-line results in individual labels that are oriented parallel, rather than perpendicular, to the machine direction. In so-called "wipe-on" label application machines that are particularly suited to high speed container labeling requirements (e.g., 250 to 700 containers/min.) the known inline produced lenticular labels adhered directly from the machine direction web result in a "sideways" orientation relative to the containers; to correct this condition, the labels must be re-oriented to the containers, which thus makes the process less efficient and more costly.

Furthermore, it is appreciated by those skilled in the art that a lenticular label having its lenticules oriented in a "sideways" sense relative to a container typically will not conform adequately to curved surfaces of the container. Conversely, a label having lenticules oriented with a major axis of the container, in a top-to-bottom sense, will conform quite well to the surfaces of the container. This conformation, or lack thereof, of the lenticular label to the container surface is analogous to a manner in which corrugated cardboard is easily bendable in one orientation (perpendicular to the lengthwise corrugations) but is not readily bendable in an orientation aligned with the corrugations.

Thus, there exists a need for an in-line manufacturing device and method for creation of lenticular lens material, which provides an orientation of the material that is perpendicular to the machine direction.

SUMMARY OF THE INVENTION

An object of the present invention is to provide an in-line process that creates lenticular lens material in an orientation that is perpendicular to the machine direction.

Another object of the present invention is to provide an in-line process that creates lenticular lens material in any selected orientation relative to the machine direction.

In accordance with the present invention, a lenticular lens material is constructed in an in-line converting and/or printing process. The process includes an optically clear film having a top surface and a bottom surface. Lenticules are embossed or are otherwise formed on the top surface of the film, in a selected direction relative to a machine direction of the in-line process.

DETAILED DESCRIPTION OF THE INVENTION

In the following exposition, the term "optically clear film" is used to describe any film or material that is suitable for use in the printing arts and has a substantially transparent quality. Material compositions of such commercially available films may include, for example, polypropylene, polyester, polyethylene, polyvinylchloride, and polystyrene. All such compositions are considered to be polymeric film materials and are synonymous therewith.

Figure 1:
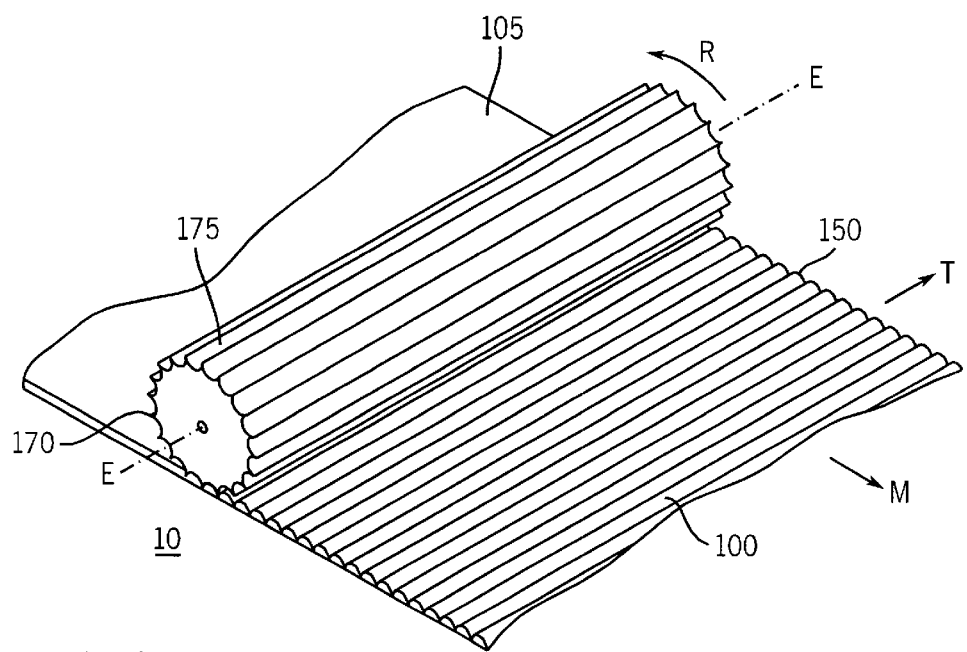
FIG. 1 is a perspective illustration of a preferred embodiment of in-line lenticular film manufacturing having a selected web orientation, in accordance with the present invention.

Referring to FIG. 1, thereshown is a perspective illustration of an in-line process 10 for manufacture of a lenticular lens material. In-line process 10 includes an optically clear material web or film 100 having a top surface 105. Dimensions of film 100 are defined by a lengthwise machine direction reference axis M and a transverse reference axis T. Transverse reference axis T is substantially perpendicular to axis M.

In-line process 10 also includes an in-line converting device or embosser 170 for formation of lenticules 150 in top surface 105 of film 100. As used herein, the term embosser may include (although not specifically shown in the drawings) any suitable in-line converting device for embossing film 100 such as a roller, plate, or some other source of pressure to impart a desired shape or texture to a web material, and may also include an extruding process (again, not shown) whereby, for example, semi-molten optically clear film material is formed into lenticules 150. Embosser 170 preferably embodies a roller having a selected number of embossing channels 175. Again, although depicted as a cylindrical roller, embosser 170 may comprise any suitable flatbed or rotary embossing die technique, as known in the art. As embosser 170 forcibly rolls in a direction R about its cylindrical axis E on top surface 105 of film 100, lenticules 150 are formed in film 100 in the well-known manner of such embossing devices.

It is to be particularly understood that embossing channels 175 of embosser 170 may be oriented in any selected direction or pattern relative to cylindrical axis E, machine direction reference axis M, and transverse reference axis T. Accordingly, lenticules 150 formed by embosser 170 may be oriented in any selected direction (preferably, for wipe-on label applications, in a direction perpendicular to axis M and parallel with axis T).

For in-line process 10, optically clear film 100 is provided in roll or continuous web form for introduction to an in-line printing and converting press, as will be further described with reference to FIG. 2. It is to be appreciated that optical characteristics of optically clear film 100 allow an image to be viewed through top surface 105 including lenticules 150. Specifically, when a particular lineform or interlaced image (as will be further described) is viewed through lenticules 150, an illusion of three-dimensionality or of motion may be observed in the image.

Figure 2:
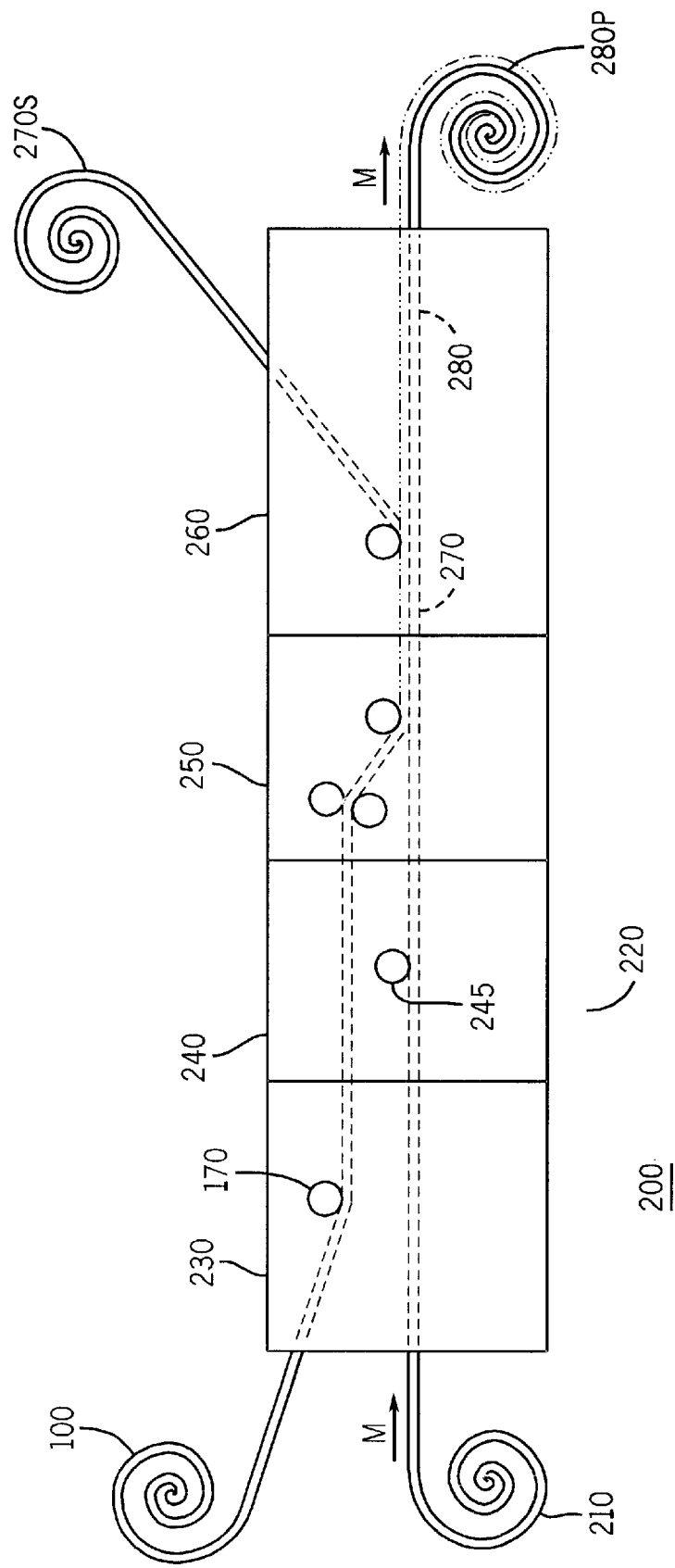
FIG. 2 is a schematic diagram of an in-line lenticular label manufacturing process of the present invention.

Turning, now, to FIG. 2, there depicted is an exemplary in-line web press manufacturing scheme 200 for mass production of lenticular labels.

In FIG. 2, a base web 210 is shown as being supplied in a conventional roll form to a multi-unit press 220, in a direction of lengthwise machine direction reference axis M (of FIG. 1). Base web 210 is preferably a pressure-sensitive (p-s) adhesive laminate base web. It is to be understood, however, that any suitable in-line base web (whether a p-s adhesive laminate, an unsupported film, or an unsupported paper base, for example) may be utilized in scheme 200 as desired. Base web 210 is commercially available and has properties that may also be identical to those of the aforedescribed optically clear film 100.

Multi-unit press 220 includes a lenticularizing station 230, a base web printing station 240, a laminating station 250, and a converting station 260, as will be further described.

In FIG. 2, optically clear film 100 is depicted as being supplied to press 220 at lenticularizing station 230, for formation of lenticules thereupon as described in FIG. 1. Film 100 having been lenticularized is then passed through printing station 240 to laminating station 250.

Concurrently, base web 210 is supplied to press 220, through station 230, at base web printing station 240. At printing station 240, base web 210 receives interlaced images printed thereon at printer 245, corresponding to individual labels.

After the interlaced images are provided on base web 210, web 210 is advanced to laminating station 250, for the laminating, joining, or "marrying" of lenticularized film 100 to printed base web 210, to form a label web 270 as is known in the art.

Label web 270 is then passed downstream to converting station 260, where die cutting or other perforation techniques may be performed thereon for creation of individual labels comprising three-dimensional image constructions.

Converting station 260 also performs an operation of removing waste or scrap 270S from label web 270 that had been die cut to form individual labels as aforedescribed to form a product label web 280. Re-winding of waste 270S may then be accomplished by any number of well-known re-winding methods, for ease of disposal thereof.

Finally, product label web 280 containing the individual three-dimensional image labels may be re-wound into a supply roll as a finished product 280P, again by way of any number of well-known methods, for ease of handling thereof. Alternatively, of course, web 280 could be processed into a stack of sheets (not illustrated) containing a series of individual labels.

It is to be understood that press 220 is selectively capable of providing a variable number of print stations (not illustrated) for application and drying of pigmented inks, coatings, and adhesives that may be applied to web 210 and also, if desired, to film 100. As understood by those of ordinary skill in the printing arts, the exemplary multi-unit press 220 may be any suitable narrow- or wide-web press such as a flexographic, letterpress, gravure, screen, or offset press. Such presses are commercially available from, for example, Comco International of Milford, Ohio, or Mark Andy Inc. of St. Louis, Mo.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

For example, in the exemplary in-line web press manufacturing scheme 200 of FIG. 2, and as mentioned above with reference to FIG. 1, lenticularizing station 230 may be capable of forming lenticules 150 in any orientation or pattern; such an orientation could be, for example, diagonal to machine direction reference axis M. Further, such a selected pattern could be a "bulls eye" or concentrically circular pattern, for fabrication of a lenticular lens material that has a property of visual magnification or enlargement of an area being viewed therethrough.

Also, interlaced images could be printed directly on a bottom surface of film 100, then laminated to a plain or non-printed base web 210. With interlaced images printed directly on the bottom surface of film 100, base web 210 could even be omitted entirely.

Further, lenticularizing station 230 of FIG. 2 may employ, as an alternative to embosser 170, any suitable screen printing and/or extruding technique. Such a screen printing and/or extruding technique may utilize, for example, flowable and/or viscous clear inks, resins, or varnishes, for selected formation of lenticules 150 in any pattern or orientation relative to the machine direction reference axis M. In such a technique, the "curing" or drying time of the ink, resin, or varnish is closely monitored for proper "doming" and creation, accordingly, of lenticules 150.

Additionally, in-line process 10 and its label manufacturing scheme 200 may employ any suitable full or partial embossing (via modifications to embosser 170 and lenticularizing station 230) and full or partial screen printing, for "spot" lenticular coverage as may be desired in, for example, production of a particular label.

It is to be understood, then, that any suitable alternatives may be employed to provide in-line lenticular film manufacturing having a selected web orientation of the present invention, along with its label manufacturing scheme.

Lastly, the choice, of course, of compositions, sizes, and strengths of various aforementioned components of in-line lenticular film manufacturing having a selected web orientation are all a matter of design choice depending upon intended uses of the present invention.

Accordingly, these and other various changes or modifications in form and detail of the present invention may also be made therein, again without departing from the true spirit and scope of the invention as defined by the appended claims.

What is claimed is:

1. A process for selectively orienting lenticules in manufacturing optically clear stock lenticular web material, comprising the steps of:

providing an optically clear flat material web, said optically clear flat material web having a major lengthwise machine direction axis and a minor transverse axis; and forming at least one lenticule in said optically clear flat material web in a selected orientation other than parallel to said machine direction axis, by advancing said optically clear flat material web in a direction of said machine direction axis to an in-line converting device, wherein said converting device is adjusted to create lenticules in said selected orientation.

2. A process for selectively orienting lenticules in manufacturing optically clear stock lenticular web material, comprising the steps of:

providing an optic ally clear flat material web, said optically clear fiat material web having a major lengthwise machine direction axis and a minor transverse axis;

forming at least one lenticule in said optically clear flat material web in a selected orientation other than parallel to said machine direction axis, by advancing said optically clear flat material web in a direction of said machine direction axis to an in-line converting device, wherein said converting device is adjusted to create lenticules in said selected orientation; and joining said material web with an interlaced image web corresponding to said at least one lenticule, to produce an image having a visual illusion.

3. A process for selectively orienting lenticules in manufacturing optically clear stock lenticular web material, comprising the steps of:

providing an optically clear flat material web, said optically clear flat material web having a major lengthwise machine direction axis and a minor transverse axis;

forming at least one lenticule in said optically clear flat material web in a selected orientation other than parallel to said machine direction axis, by advancing said optically clear flat material web in a direction of said machine direction axis to an in-line converting device, wherein said converting device is adjusted to create lenticules in said selected orientation; and printing at least one interlaced image on a surface of said material web opposite said at least one lenticule and corresponding thereto, to produce an image having a visual illusion.

4. The process as claimed in claim 1, wherein said selected orientation is perpendicular to said machine direction axis.

5. The process as claimed in claim 2, wherein said selected orientation is perpendicular to said machine direction axis.

6. The process as claimed in claim 3, wherein said selected orientation is perpendicular to said machine direction axis.

* * * * *